form Office 3,562,258
Patented Feb. 9, 1971

3,562,258
N¹-[p-AMINO BENZENE SULFONYL]-N³-[4.5-DI-
METHYL OXAZOLYL-(2)] GUANIDINE
Werner Loop, Hamburg-Lokstedt, and Horst Baganz, Friedrich - Wilhelm Kohlmann, and Hans Schultze, Moorrege, near Utersen, Germany, assignors to Nordmark-Werke G.m.b.H., Hamburg, Germany, a corporation of Germany
No Drawing. Filed Feb. 10, 1969, Ser. No. 798,165
Int. Cl. A61k 27/00; C07d 85/46
U.S. Cl. 260—239.9                    1 Claim

ABSTRACT OF THE DISCLOSURE

The present invention is related to N¹-[p-amino-benzene sulfonyl]-N³-[4.5-dimethyl oxazolyl-(2)] guanidine, pharmaceutical compositions comprising the same, and to a process for the treatment of bacterial dysenteritides.

---

It is an object of the present invention to provide a new sulfonamide compound having improved properties, in particular having a low degree of resorption from the gastrointestinal tract.

Other objects of the present invention and advantages thereof will become apparent as the description proceeds.

The present invention is related to N¹-[p-amino benzene sulfonyl]-N³-[4.5-dimethyl oxazolyl-(2)] guanidine of the Formula I

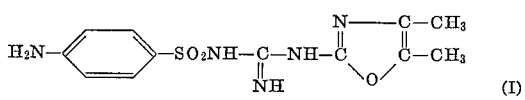

pharmaceutical compositions comprising the same as active ingredient, and processes for the production of the compound of Formula I.

The process for the production of the new sulfonamide compound of Formula I comprises subjecting an N¹-benzene sulfonyl-N³-cyano guanidine of the general Formula II

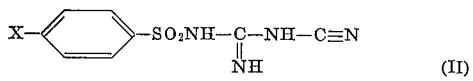

wherein X is the amino group or a groupment which may be converted into an amino group, to reaction with acetoin $CH_3$—CO—CO—$CH_3$ and thereafter, if X is a groupment which may be converted into an amino group, converting said groupment into an amino group in manners known per se.

The process for the production of the new sulfonamide of Formula I is carried out in water, a polar organic solvent or a mixture of water and a polar organic solvent in the presence of an acid. The acid concentration may vary within wide limits. The pH of the reaction mixture should not exceed 3.5 since then the reaction proceeds too slowly. The reaction temperature may be between 40° C. and the boiling point of the solvent used. The separation of the reaction product from the reaction mixture is simple in view of the low solubility thereof in the solvent used. It either separates during the reaction in the form of crystals or it crystallizes upon cooling or upon dilution with water.

X in Formula II is such that it is converted into the amino group either by saponification or by hydrogenation. Preferably, X is an acylamido group, most preferably a lower alkanoyl amido group such as the acetylamido, propionylamido or butyrylamido group. X furthermore may be a carboalkoxy amido group, preferably the carbolower alkoxy amido groups, such as the methoxy carbonyl amido-, ethoxy carbonyl amido- or propoxy carbonyl amido group. The most preferred group among such saponifiable groups is the acetyl amido group. Other acyl groups are known from the chemistry of peptides as protective groups for the amino group. Still further groupments which may be converted into an amino group by hydrogenation are the azo group and above all the nitro group. Saponification is effected in the presence of an acid or alkali with heating. Hydrogenation is carried out for instance with hydrogen in the presence of a suitable catalyst such as Raney nickel or another manner such as $Na_2S_2O_4$.

The new N¹-[p-amino benzene sulfonyl]-N³-[4.5-dimethyl oxazolyl-(2)] guanidine of Formula I until now unknown is characterized by particular chemotherapeutical, namely bacteriostatic properties. As follows from Table 1 hereinbelow, the new compound is resorbed from the gastro-intestinal tract only to a very low extent, which is desired in the treatment of infections of the gastro-intestinal tract.

TABLE 1

Comparison of the blood level in white mice after a single dose oral administration of 1000 mg./kg. of N¹-[p-amino benzene sulfonyl]-N³-[4.5-dimethyl oxazolyl-(2)] guanidine and 2-[p-amino benzene sulfonyl] amino-4.5-dimethyl oxazole.

| Test compound | After administration | | | |
|---|---|---|---|---|
| | 1 hr., mg./percent | 2 hrs., mg./percent | 4 hrs., mg./percent | 8 hrs., mg./percent |
| 2-[p-amino benzene sulfonyl]-4.5-dimethyl ozaxole | 41.0 | 43.0 | 36.5 | 32.6 |
| N¹-[p-amino benzenesulfonyl]-N³-[4.5-dimethyl oxazolyl-(2)] guanidine | 2.1 | 3.5 | 1.6 | 0.7 |

The blood concentration of the new compound N¹-[p-amino benzene sulfonyl]-N³-[4.5-dimethyl oxazolyl-(2)] guanidine is very low in comparison to 2-[p-amino benzene sulfonyl] amino-4.5-dimethyl-oxazole administered under equal conditions which latter product is known as a well resorbed drug. Correspondingly low is the concentration of the new compound in the organs.

A test of the excrements shows that 80% of the new compound N¹-[p-amino benzene sulfonyl]-N³-[4.5-dimethyl oxazolyl-(2)] guanidine is found in the collected excrements of the test animals while only 2.5 to 4.5% of the total dose are found in the collected urine. In comparison thereto and under equal conditions, 80% and more of the administered dose of 2-[p-amino benzene sulfonyl]amino-4.5-dimethyl oxazole are found in the collected urine. The drug sulfaguanidine (p-amino benzene sulfonyl guanidine) which is known as drug for the treatment of intestinal ill conditions, is excreted to 50% with the urine (Poth, Texas Reports on Biol. and Med. 4 (1946), p. 68).

It follows from the test result that the new compound of the present invention is resorbed from the gastro-intestinal tract almost not at all.

In the following Table 2 the chemotherapeutic effectiveness of the new compound N¹-[p-amino benzene sulfonyl]-N³-[4.5-dimethyl oxazolyl-(2)] guanidine in the intestinal tract is compared with the effectiveness of the known compounds sulfaguanidine and the 2-[p-amino benzene sulfonyl]amino-4.5-dimethyl oxazole.

TABLE 2

Comparison of chemotherapeutic (bacteriostatic) effectiveness in the intestinal tract of white mice.

| Test compound | Number of test animals | Oral dose, mg./kg. | Percent bacteristasis | Percent insecure effectiveness | Percent ineffectiveness |
|---|---|---|---|---|---|
| Sulfaguanidine | 29 | 1,000 | 24.1 | 3.4 | 72.4 |
| 2-[p-amino benzene sulfonyl]amino-4.5-dimethyloxazole | 30 | 250 | 16.5 | 27.5 | 56.6 |
| $N^1$-[p-amino benzene sulfonyl]-$N^3$-[4.5-dimethyloxazolyl-(2)] guanidine | 29 | 250 | 48.2 | 24.1 | 27.5 |

In the tests, the results of which are given in Table 2, the effect of the test compounds to Coli bacteria of the intestinal tract has been determined. In each test animal, the number of Coli bacteria has been determined in a weighed amount of excrement before administration of the test compounds and then 6 hours thereafter. "Bacteriostasis" in Table 2 means a high reduction of the number of Coli bacteria after administration of the compound, "insecure effectiveness" means a low reduction thereof and "ineffectiveness" means no reduction thereof at all.

It follows from Table 2 that the new compound $N^1$-[p-amino benzene sulfonyl]-$N^3$-[4.5-dimethyl oxazolyl-(2)] guanidine is substantially more effective than the known compound sulfaguanidine. It is furthermore more effective in the gastro-intestinal tract than 2-[p-amino benzene sulfonyl]amino-4.5-dimethyl oxazole known as chemotherapeutically highly effective since this known compound is resorbed into high amounts.

The new compound of Formula I is intended as active principal in the treatment of ill conditions of the intestine.

The following examples further illustrate the present invention.

EXAMPLE 1

$N^1$-[p-amino benzene sulfonyl]-$N^3$-[4.5-dimethyl oxazolyl-(2)] guanidine 23.9 g. (0.1 mol of $N^1$-[p-amino benzene sulfonyl]-$N^3$-cyano guanidine and 13.2 g. (0.15 mol) of acetoin are thoroughly stirred in a mixture of 120 cc. of water and 120 cc. of methanol. 25 cc. of concentrated hydrochloric acid are added dropwise with stirring to this suspension at 40° C. A clear solution is obtained after 30 minutes which solution is kept at 40° C. for another hour. Thereafter, the methanol is distilled off in a vacuum, the remaining solution is treated with charcoal and the pH of the filtered solution is quickly brought to 11 by addition of 10% soda lye with vivid stirring. The compound at first precipitated is redissolved at a pH of 11. The solution is treated another time with charcoal and is filtered. Thereafter, a mixture of anhydrous acetic acid and water in a proportion of 1:1 is added with stirring and cooling until a pH of 7 is reached. Thus, the reaction product separates with crystallization.

For purification, the product is recrystallized from 15 times the amount of a 9:1 mixture of acetone and water. The resulting $N^1$-[p-amino benzene sulfonyl]-$N^3$-[4.5-dimethyl-oxazolyl-(2)]guanidine is obtained as colorless crystals having a melting point at 233 to 236° C.

EXAMPLE 2

$N^1$-[p-amino benzene sulfonyl]-$N^3$-[4.5-dimethyl oxazolyl-(2)] guanidine 28.1 g. (0.1 mol) of $N^1$-[p-acetamido benzene sulfonyl]-$N^3$-cyano guanidine and 13.2 g. (0.15 mol) of acetoin are mixed with 120 cc. of water and 120 cc. of methanol with stirring and heating to 55° C. 34 cc. of 36% hydrochloric acid are added thereto dropwise with stirring. A clear solution is obtained after 10 minutes which is heated to 55° C. for another 15 minutes. The reaction mixture is cooled, the methanol is distilled off and the mixture is diluted with an equal amount of water and is treated with charcoal. Soda lye is added thereto quickly with thorough stirring until a pH of 11 to 12 is reached, thus producing a clear solution. This solution is again treated with charcoal with stirring, the charcoal is filtered off and a 1:1 mixture of anhydrous acetic acid and water is added thereto with stirring and cooling until a pH of 4 is reached. Thus, the reaction product is separated as a voluminous precipitation which is filtered off and washed with water. The precipitate is stirred with 150 cc. of 10% soda lye. Thus, the sodium salt of $N^1$-[p-acetamido benzene sulfonyl]-$N^3$-[4.5-dimethyl oxazolyl-(2)]-guanidne crystallizes upon cooling with ice. The salt is filtered off, washed with a 20% solution of sodium chloride, the wet filter cake is stirred with 500 cc. of water and hydrochloric acid is added thereto until a pH of 7 is reached. Thus, $N^1$-[p-acetamido benzene sulfonyl]-$N^3$-[4.5-dimethyl oxazolyl-(2)]-guanidine separates as colorless crystals which melt between 241 to 244° C. In order to split off the acetyl group, the product is heated for 30 minutes to boiling with reflux in 150 cc. of 10% soda lye. The reaction mixture is diluted with 150 cc. of boiling water and filtered and hydrochloric acid is added until a pH of 7. Thus, $N^1$-[p - amino benzene sulfonyl]-N3-[4.5-dimethyl oxazolyl-(2)]-guanidine is obtained as colorless crystals melting at 235 to 237° C.

EXAMPLE 3

Tablets

|  | Mg. |
|---|---|
| $N^1$-[p-amino-benzene sulfonyl] - $N^3$ - [4,5-dimethyl oxazolyl-(2)] guanidine | 400.0 |
| Corn starch | 40.0 |
| Gelatine | 5.0 |
| Aerosil | 10.0 |
| Corn starch | 20.0 |
| Magnesium stearate | 5.0 |
|  | 480.0 |

The $N^1$-[p-amino benzene sulfonyl]-$N^3$-[4.5-dimethyl oxazolyl-(2)] guanidine and 40.0 mg. of corn starch are granulated with an aqueous solution of gelatine. Thereafter, the product is thoroughly mixed with aerosil, 20.0 mg. of corn starch and magnesium stearate. Tablets weighing 480 mg. each and having a diameter of 11 mm. are prepared and pressed from this product. If desired these tablets are coated with a sugar coating to form dragees in manners known per se.

EXAMPLE 4

Juice

|  | G. |
|---|---|
| $N^1$-[p-amino benzene sulfonyl] - $N^3$ - [4.5-dimethyl oxazolyl-(2)] guanidine | 10.0 |
| Methyl cellulose | 2.5 |
| Benzoic acid | 0.1 |
| Sodium cyclamate | 0.2 |
| Flavor | 0.01 |
| Water, filled up to yield | 100.0 |

The $N^1$-[p-amino benzene sulfonyl]-$N^3$-[4.5-dimethyl oxazolyl-(2)] guanidine is thoroughly suspended in the thickened solution of methyl cellulose. Benzoic acid, sodium cyclamate and the flavor is added thereto. One teaspoon of the above juice (equal to 5 cc.) contains 0.5 g. of $N^1$-[p-amino benzene sulfonyl]-$N^3$-[4.5-dimethyl oxazolyl-(2)] guanidine.

The products of the present invention are in particular used in the treatment of bacterial dysenteritides (enteritis, enterogastritis, enterocolitis, summer diarrhae). The products are administered in the following doses: in severe cases, 2 dragees prepared according to Example 3 three times per day during the first to the third day after the beginning of the treatment; thereafter, one dragee three times daily for the following three to five days. Usual dose: two dragees prepared according to Example 3 three times per day in the first day of treatment, one dragee three times daily for the following approximately five days. With these doses, a quick recovery and cure of the above ill-conditions has been achieved in more than 90% of the cases treated. No undesirable side effect have been observed up to now.

EXAMPLE 5

A human suffering from bacterial enteritis has been treated one day with three times two dragees prepared according to Example 3 and during the following five days with one dragee three times per day. A quick disappearance of the ill condition and a quick cure has been achieved.

What we claim is:

1. $N^1$ - [p - amino benzene sulfonyl]-$N^3$-[4.5 - dimethyl oxazolyl-(2)] guanidine of the Formula I

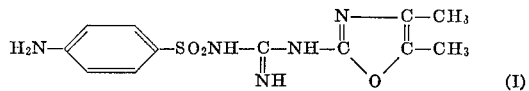

(I)

References Cited

UNITED STATES PATENTS 2,809,966    10/1957    Loop et al. _____ 260—239.9

HENRY R. JILES, Primary Examiner

C. U. SHURKO, Assistant Examiner

U.S. Cl. X.R.

424—229